United States Patent
Zhang et al.

(10) Patent No.: US 6,784,944 B2
(45) Date of Patent: Aug. 31, 2004

(54) MOTION ADAPTIVE NOISE REDUCTION METHOD AND SYSTEM

(75) Inventors: Biao Zhang, Sunnyvale, CA (US); Jin Ji, Sunnyvale, CA (US)

(73) Assignee: SmartASIC, Inc., San Jose, CA (US)

( * ) Notice: Subject to any disclaimer, the term of this patent is extended or adjusted under 35 U.S.C. 154(b) by 473 days.

(21) Appl. No.: 09/885,775

(22) Filed: Jun. 19, 2001

(65) Prior Publication Data

US 2003/0007099 A1 Jan. 9, 2003

(51) Int. Cl.[7] .......................... H04N 5/21; H04N 5/213; H04N 5/217
(52) U.S. Cl. ...................... 348/607; 348/619; 348/622; 348/620; 382/262
(58) Field of Search ................................ 348/607, 619, 348/618, 622, 623, 699, 700, 701, 669, 606; 382/260, 262, 264, 149; H04N 5/21, 5/213, 5/217

(56) References Cited

U.S. PATENT DOCUMENTS 6,229,578 B1 * 5/2001 Acharya et al. ............ 348/607
6,281,942 B1 * 8/2001 Wang ......................... 348/607
6,346,970 B1 * 2/2002 Boehlke ...................... 348/447
6,433,834 B1 * 8/2002 Nie ............................. 348/607
6,529,622 B1 * 3/2003 Pourjavid ................... 382/149
6,535,254 B1 * 3/2003 Olsson et al. ............... 348/607

* cited by examiner

Primary Examiner—Michael H. Lee
Assistant Examiner—Trang U. Tran
(74) Attorney, Agent, or Firm—Bever, Hoffman & Harma, LLP; Edward S. Mao

(57) ABSTRACT

A method and system of noise filtering is provided. The pixels of a first filter mask are separated into groups based on luminance ... The sizes of each group is determined and a largest group is selected. The distance of each group of pixels from the largest group is also calculated. Pixels in groups that are small compared to the largest group and far from the largest group are tagged as noisy. After tagging the noisy pixels, additional filtering can be applied to the pixels of first filter mask without degradation from the tagged pixels.

17 Claims, 7 Drawing Sheets

MOTION ADAPTIVE NOISE REDUCTION METHOD AND SYSTEM

BACKGROUND OF THE INVENTION

1. Field of the Invention

The present invention relates to digital image and video processing. More specifically, the present invention relates to methods of noise reduction for digital images of a digital video stream.

2. Discussion of Related Art

Due to advancing semiconductor processing technology, integrated circuits (ICs) have greatly increased in functionality and complexity. With increasing processing and memory capabilities, many formerly analog tasks are being performed digitally. For example, images, audio and even full motion video can now be produced, distributed, and used in digital formats.

FIG. 1(a) is illustrative diagram of a digital video stream 100. Digital video stream 100 comprises a series of individual digital images 100_0 to 100_N, each digital image of a video stream is often called a frame. For full motion video a video frame rate of 60 images per second is desired. As illustrated in FIG. 1(b), a digital image 100_Z comprises a plurality of picture elements (pixels). Specifically, digital image 100_Z comprises Y rows of X pixels. For clarity, pixels in an digital image are identified using a two-dimensional coordinate system. As shown in FIG. 1(b), pixel P(0, 0) is in the top left corner of digital image 200. Pixel P(X-1, 0) is in the top right corner of digital image 100_Z. Pixel P(0, Y-1) is in the bottom left corner and pixel P(X-1, Y-1) is in the bottom right corner. Typical image sizes for digital video streams include 640×480, 320×240 and 160 by 120.

Although digital images generally provide higher noise immunity, most digital images in digital video streams are converted from analog video streams. The original analog video stream may contain noise from various sources. For example, if the analog video is transferred over transmission lines, magnetic fields around the transmission line may add gaussian noise. In addition, salt and pepper noise (i.e., bright spots on a dark background or dark spots on a white background) may be caused by interference from other electromagnetic fields. Furthermore, the digitalizing process may inadvertently amplify minor noise problems in the analog video stream. Hence, there is a need for a noise filtering method or system to reduce noise in a digital image. Furthermore, noise filtering in a digital video stream must be performed quickly to match the frame rate of the digital video stream.

SUMMARY

Accordingly, the present invention provides a method and system for tagging pixels exhibiting a first noise type, such as salt and pepper noise and then performing a second filtering process to reduce other noise types, such as gaussian noise. By tagging pixels with the first noise type, the second filtering process is not degraded by the first noise type.

In one embodiment of the present invention, the pixels of a first filter mask are separated into a plurality of groups based on luminance. The group boundaries are determined by dividing the luminance range of the pixels into equal sized groups. Each group is assigned a group number starting with the number one. The largest group, i.e., the group with the most pixels, is determined. Groups of pixels that are small and far from the largest group are tagged as noisy.

To determine if a group is small compared to the largest group, a group size of the group is calculated. Then a group size ratio for the group is calculated by dividing the group size with the size of the largest group IF the group size ratio is smaller than a group size threshold the group is considered small. To determine if a group is far from the largest group, a group distance from the largest group is determined based on the difference in the group numbers of the group and the largest group. If the group distance is greater than a group distance threshold the group is considered far from the largest group.

After tagging groups of pixels as noisy, a second filtering process can be performed on the pixels of the first filter mask. For example, in one embodiment of the present invention gaussian noise is detected and eliminated in the second filtering process. Specifically, edge detection is performed on a second filter mask that contains a subset of the pixels of the first filter mask. If an edge is detected in the second filter mask and the center pixel is tagged as noisy, then the value of the center pixel is replaced by a median value of the pixels of the first filter mask.

If no edge is detected in the second filter mask, edge detection is performed in the first filter mask. If an edge is detected in the first filter mask, the value of the center pixel is replaced with the mean value of the pixels in the second filter mask. Otherwise, the center value is replaced with the mean value of the pixels in the first filter mask.

The present invention will be more fully understood in view of the following description and drawings.

DETAILED DESCRIPTION

Figure 1A:
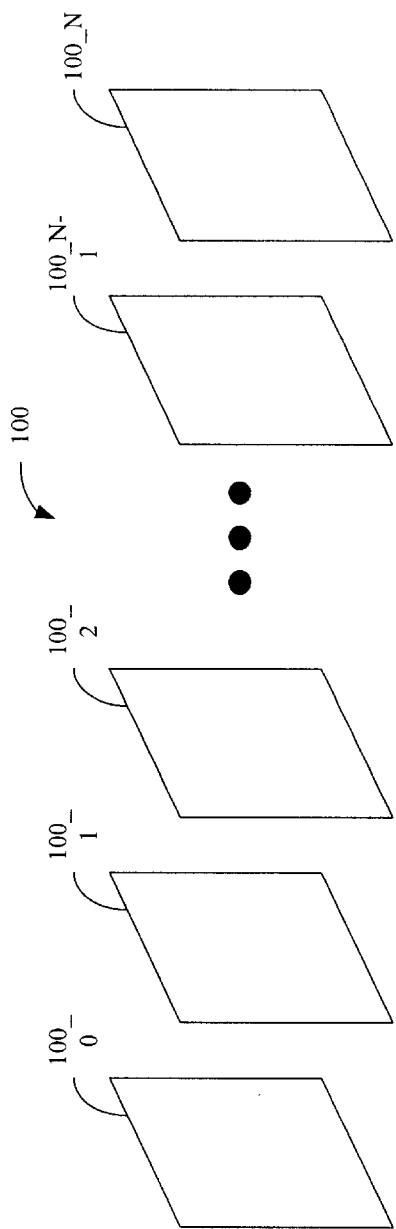
FIG. 1(a) is an illustration of a digital video stream of digital images.
Figure 1B:
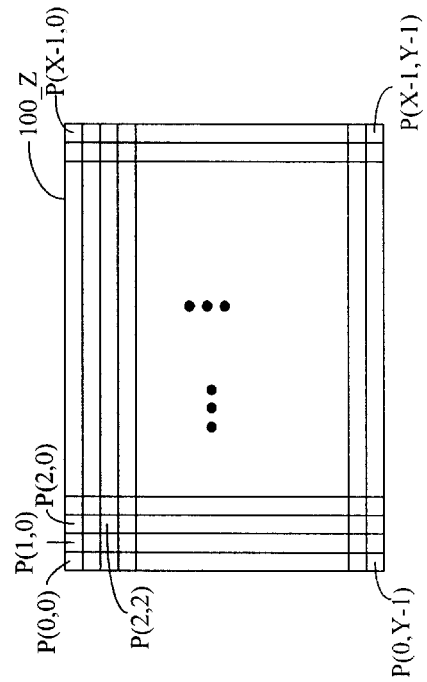
FIG. 1(b) is a diagram of a digital image comprising picture elements (pixels).
Figure 2:
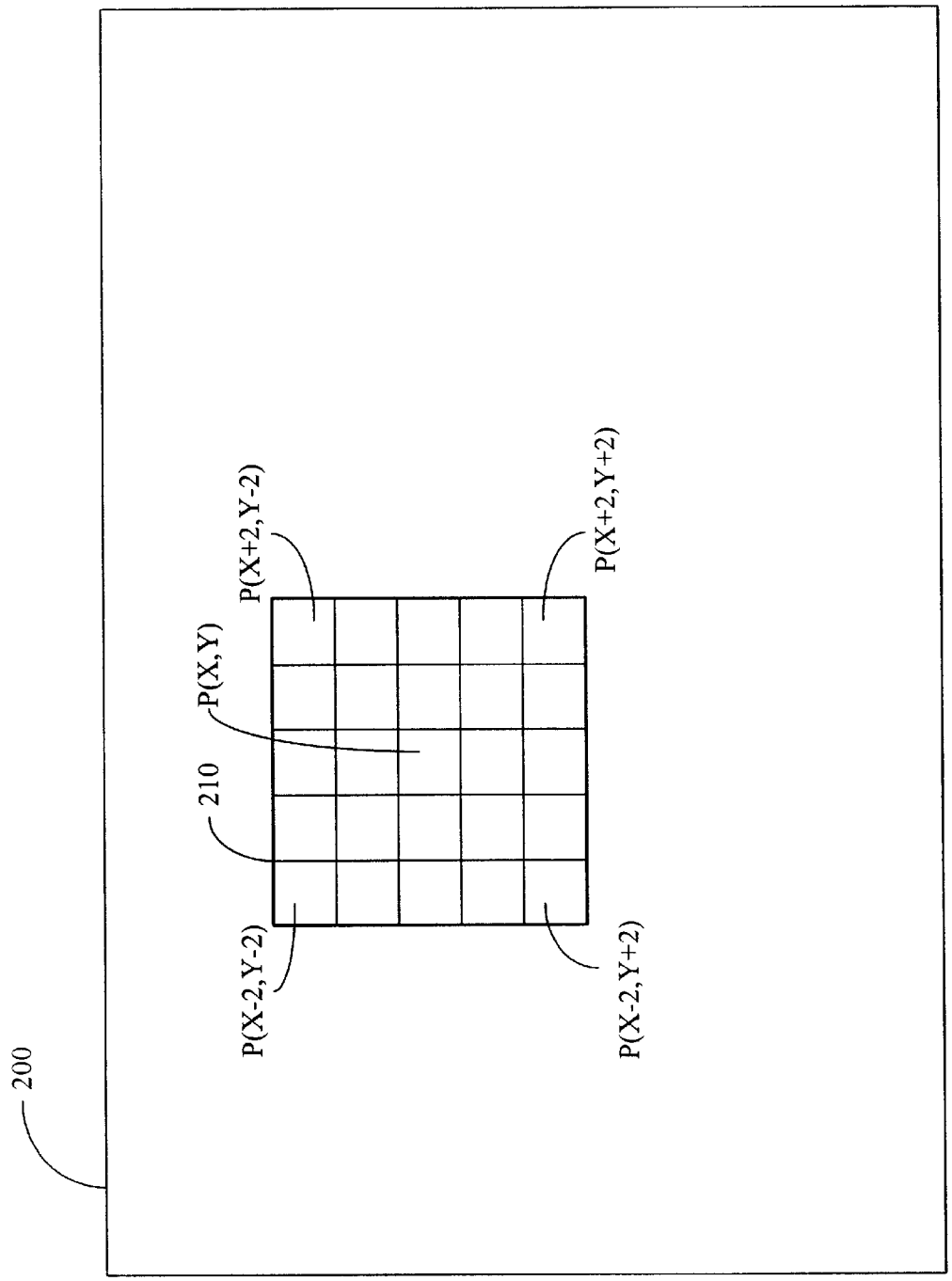
FIG. 2 is an illustration of a filtering mask in accordance with one embodiment of the present invention.

Noise filtering is generally accomplished by using a moving square window, usually referred to as a mask, centered around a particular pixel. The pixels in the mask are analyzed to determine whether the center pixel should be modified. FIG. 2 shows a digital image 200 with a mask 210 centered around pixel P(X, Y). Mask 210 is a 5×5 mask and includes 25 pixels. Specifically, Mask 210 includes the pixels in a square having corner pixels P(X-2, Y-2), P(X+2, Y-2), P(X-2, Y+2), and P(X+2, Y+2). During a noise filtering operation, mask 210 spans across every pixel in digital image 200 and the filtering operation is performed for each pixel. When filter masks 210 extends beyond the edges of digital image 200, proxy pixels are generated to fill filter mask 210. Several well known methods can be used to generate the proxy pixels, such as repeating the closest pixel in digital image 200 for the proxy pixels or using predefined proxy pixels which do not depend on digital image 200.

As explained above, a single digital image may include several types of noise. The performance of a noise filtering system designed for one type of noise may be degraded by the presence of other types of noise. For example, a noise filtering process requiring edge detection may detect false edges in the presence of salt and pepper noise. Accordingly, some embodiments of the present invention include a novel process that tags the pixels affected by salt and pepper noise prior to performing another noise filtering process, which might be degraded by the presence of salt and pepper noise.

Figure 3:
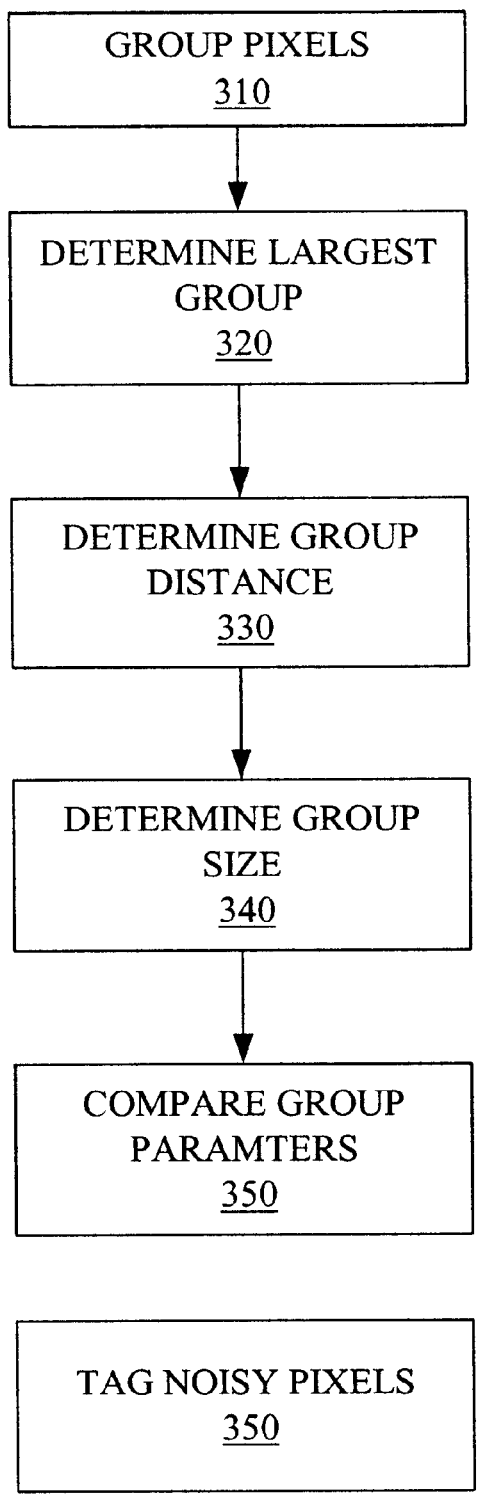
FIG. 3 is a flow diagram for salt and pepper noise filtering in accordance with one embodiment of the present invention.

As stated above noise filtering uses masks to include a plurality of pixels to determine if the center pixel should be modified. Salt and pepper pixel tagging is performed for every such plurality of pixels. Specifically, when a pixel is being filtered, the plurality of pixels included in the mask are inspected for salt and pepper noise. The pixels that are found to be caused by salt and pepper noise are tagged so that the salt and pepper noise does not degrade other noise filtering process. FIG. 3 is a flow chart illustrating an embodiment of the present invention used to tag salt and pepper noise among the pixels within mask 210.

First, the pixels are separated into a plurality of groups based on the luminance of each pixel in group pixel step 310. For example, the luminance value of a pixel typically ranges from 0 to 255. The range of luminance is partitioned into a plurality of groups. In most embodiments of the present invention the groups have equal sub-ranges sizes. However, some embodiments may use groups having different sized sub-ranges. In a specific embodiment, the luminance range of 0 to 255 is separated into 32 equal groups each with a sub-range size of 8 (i.e. the groups contain luminance values 0–7, 8–15, . . . 248–255). Another embodiment of the present invention has 8 groups with a sub-range size of 32. In general, using more groups with smaller sub-range sizes provides more accurate tagging of salt and pepper noise. However, more groups with smaller sub-range sizes require more computational overhead. For clarity, the examples described herein divide the luminance range into G groups, each having a sub-range size SRS. Furthermore, the groups are numbered sequentially from group 0 to group G−1. Thus, group N covers a sub-range spanning N*SRS to (N* (SRS+1)−1).

After, separating the pixels into groups, the largest group is determined in determine largest group step 320. If more than one group is tied for the largest number of pixels, the largest group is chosen randomly from the groups that are tied for the largest number of pixels. Then, a group distance parameter is calculated for each group in determine group distance step 330. The group distance parameter is based on the distance of a group from the largest group. For clarity, the largest group is referred to as group L. The group distance can be calculated for a group N by calculating the absolute difference between N and the group number of the largest group which is equal to L. For example if group 15 is the largest group, the group distance of group 7 is equal 8, (i.e., the absolute value of 15 minus 7). In general a group N has a group distance equal to abs(L-N), where abs(X) is the absolute value of X.

Then, a group size parameter is calculated for each group in determine group size step 340. The group size parameter is simply the number of pixels in each group. For convenience, the group size of the largest group, i.e., group L, is defined as L_S. Different embodiments of the present invention may calculate the group parameters, i.e. group size and group distance, in a different order.

The group parameters are compared to threshold values to determine which groups contain "noisy pixels" in compare group parameters step 350. In general, if the group distance is large and the group size is small, the group is likely to contain noisy pixels. In one embodiment of the present invention, threshold values for group distance and group size are provided. Specifically, a group size threshold GST is given as a percentage value as compared to L, i.e. the size of the largest group. A group distance threshold GDT is given in terms of absolute distance from the largest Group. Equations (1) and (2) provide the testing criterion to determine if a group of pixels are noisy pixels. In equation (1) and (2) group N has a group size N_S and a group distance N_D. If both equations (1) and (2) are true, then the pixels of group N are considered to be noisy pixels.

$$[N\_S/L\_S] < GST \qquad (1)$$

$$[N\_D] > GDT \qquad (2)$$

After determining which groups contain noisy pixels, the noisy pixels are tagged in tag noisy pixels step 350. In some embodiments of the present invention tagging is accomplished by replacing the noisy pixel with the average value of the largest group. Other embodiments, may simply generate a list of noisy pixels in a tag table, which can be passed onto other processes which need to know the noisy pixels.

Figure 4:
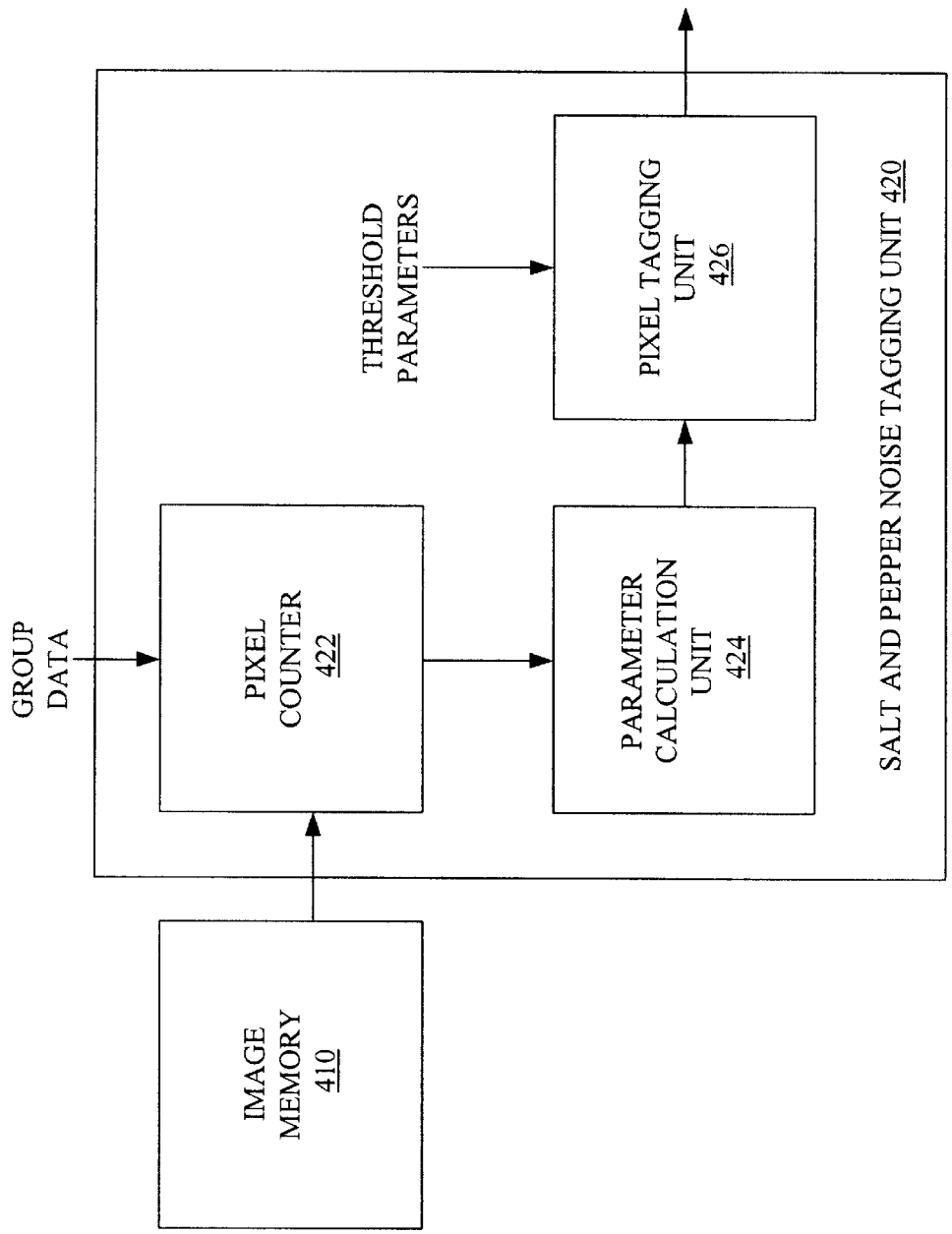
FIG. 4. is a block diagram of a salt and pepper noise tagging unit in accordance with one embodiment of the present invention.

FIG. 4 is a block diagram of a salt and pepper noise tagging unit 420 coupled to an image memory 410. Image memory 410 stores the digital image being processed. In some embodiments of the present invention only the lines being processed are stored in image memory 410. Thus for these embodiments, image memory 410 may be a plurality of line buffers. Salt and pepper noise tagging unit 420 includes a pixel counter 422, a parameter calculation unit 424 and a pixel tagging unit 426. Pixel counter 422 is coupled to image memory 410 and also receives group data, such as the number of groups and the size of the sub-ranges of each group. Pixel counter 422 is configured to determine how many pixels are within each group from the plurality of pixels within mask 210. Furthermore, pixel counter 422 determines which group contains the most pixels. In hardware implementations of the present invention, group data is usually provided by a user and stored in a memory system using SDRAM, SRAM or other solid state memories.

Parameter calculation unit 424 is coupled to pixel counter 422 and pixel tagging unit 426. Parameter calculation unit 424 receives the group sizes from pixel counter 422 and calculates the group size and group distance for each group as described above. The group parameters are passed to pixel tagging unit 426. Pixel tagging unit also receives the threshold parameters and performs the calculations described above to determine which group contains noisy pixels and tags the noisy pixels. In hardware implementations of the present invention, threshold parameters are usually stored in a non-volatile memory such as an EPROM, EEPROM, or FLASH memory.

Figure 5:
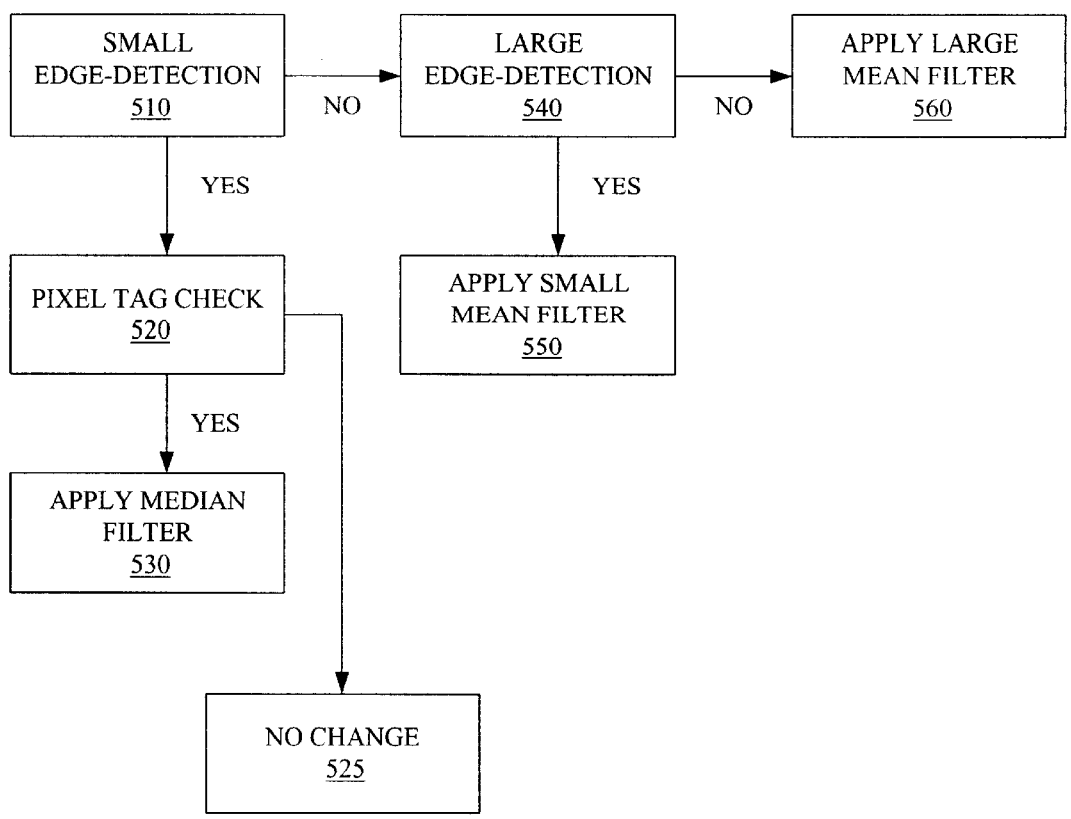
FIG. 5 is a flow diagram for gaussian noise filtering in accordance with one embodiment of the present invention.
Figure 6:
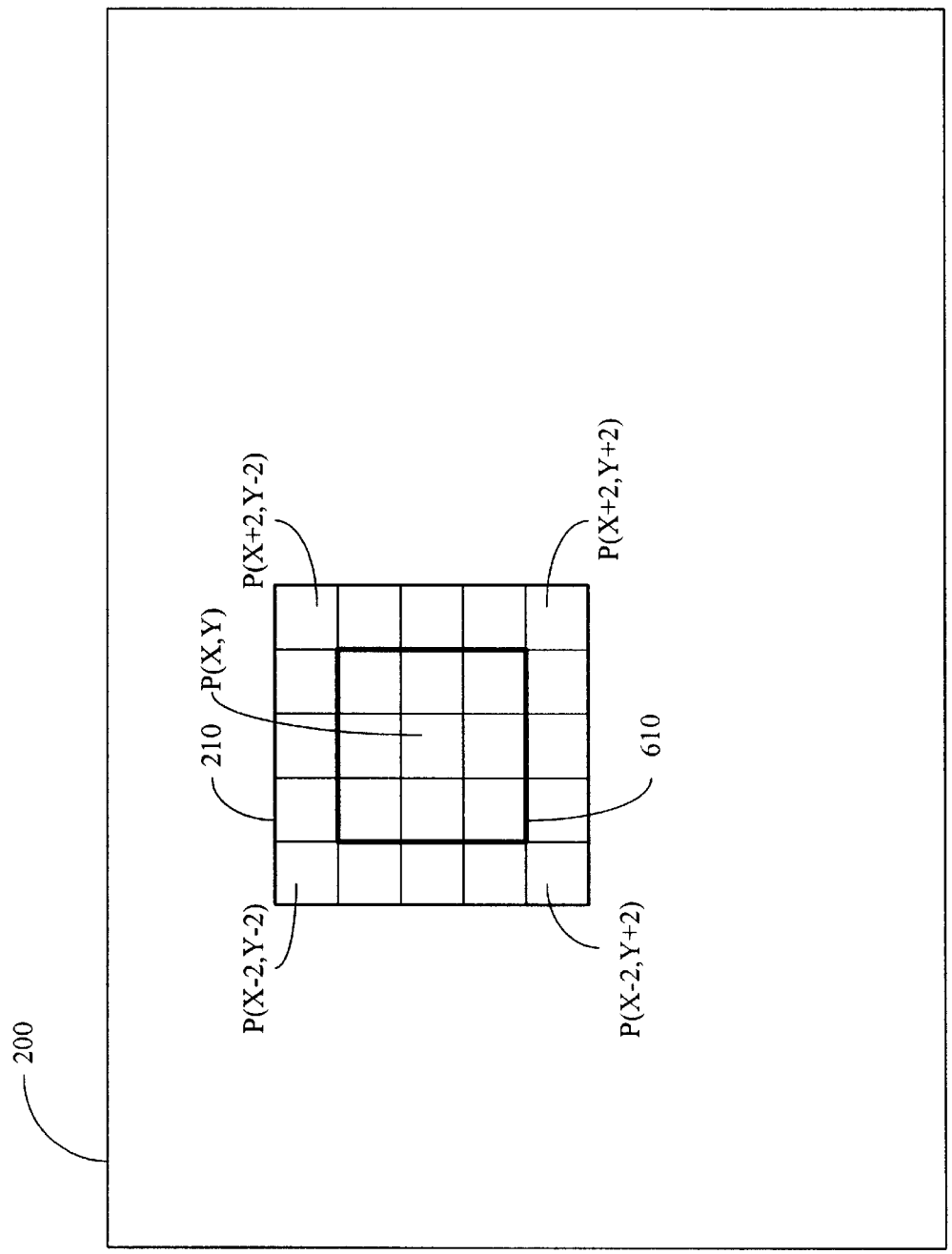
FIG. 6 is an illustration of a large filtering mask and a small filtering mask in accordance with one embodiment of the present invention.

FIG. 5 is a flow diagram of a gaussian noise filtering process in accordance with an embodiment of the present invention. The embodiment of FIG. 5 makes use of the tagged pixels found by a salt and pepper noise tagging unit such as salt and pepper noise tagging unit 420 to remove the salt and pepper noise prior to edge detection. The present invention uses both a large mask and a small mask. Both masks are centered around the same pixel. For clarity, the present invention is described with the large mask being a 5×5 mask and the small mask being a 3×3 mask. However, one skilled in the art can adapt the principles of the present invention to use any size masks. The gaussian noise filtering process of FIG. 5 makes use of a large mask and a small mask. As shown in FIG. 6, a small mask 610 is centered around pixel P(X, Y) and includes a subset of the pixels in large mask 210. Specifically in FIG. 6, small mask 610 is a 3×3 mask having 9 pixels. For clarity, the present invention is described with the large mask being a 5×5 mask and the small mask being a 3×3 mask. However, one skilled in the art can easily adapt the principles of the present invention to use any size masks.

As shown in FIG. 5, after the salt and pepper noise is tagged, edge detection is applied to the pixels of small mask 610 in small edge-detection step 510. If an edge is detected within small mask 610, then pixel P(X, Y) is checked against the tagged noise pixels in pixel tag check step 520. If pixel P(X, Y) was tagged as a noisy pixel, then a median filter is applied to pixel P(X, Y) in apply median filter step 530. The median filter replaces the luminance value of P(X, Y) with the median luminance value of the pixels in large mask 210. Alternatively, the luminance value of pixel P(X, Y) may be replaced with a zero value and the filter mask is processed as having eight pixels rather than nine. However, if an edge is detected in small mask 610 and pixel P(X, Y) is not tagged as a noisy pixel, the luminance of pixel P(X, Y) is not modified as illustrated by no change step 525. In general, if a the luminance of a pixel is modified, the corresponding chrominance of the pixel is modified in the same way. For example, if a median filter is applied to the luminance value of a pixel, a median filter should also be applied to the chrominance value.

If no edge is detected in small mask 610, edge detection is performed on the pixels of large mask 210 in large edge-detection step 540. If an edge is detected in large mask 210, a mean filter of small mask 610 is applied to pixel P(X, Y) in apply small mean filter step 550. Specifically, the luminance of pixel P(X, Y) is replaced with the mean luminance of the pixels of small mask 610. If no edge is detected in large mask 210 then a mean filter of large mask 210 is applied to pixel P(X, Y) in apply large mean filter step 560. Specifically, the luminance of pixel P(X, Y) is replaced with the mean luminance of the pixels of large mask 210. As explained above similar modifications to the chrominance of pixel P(X,Y) can also be performed.

Figure 7:
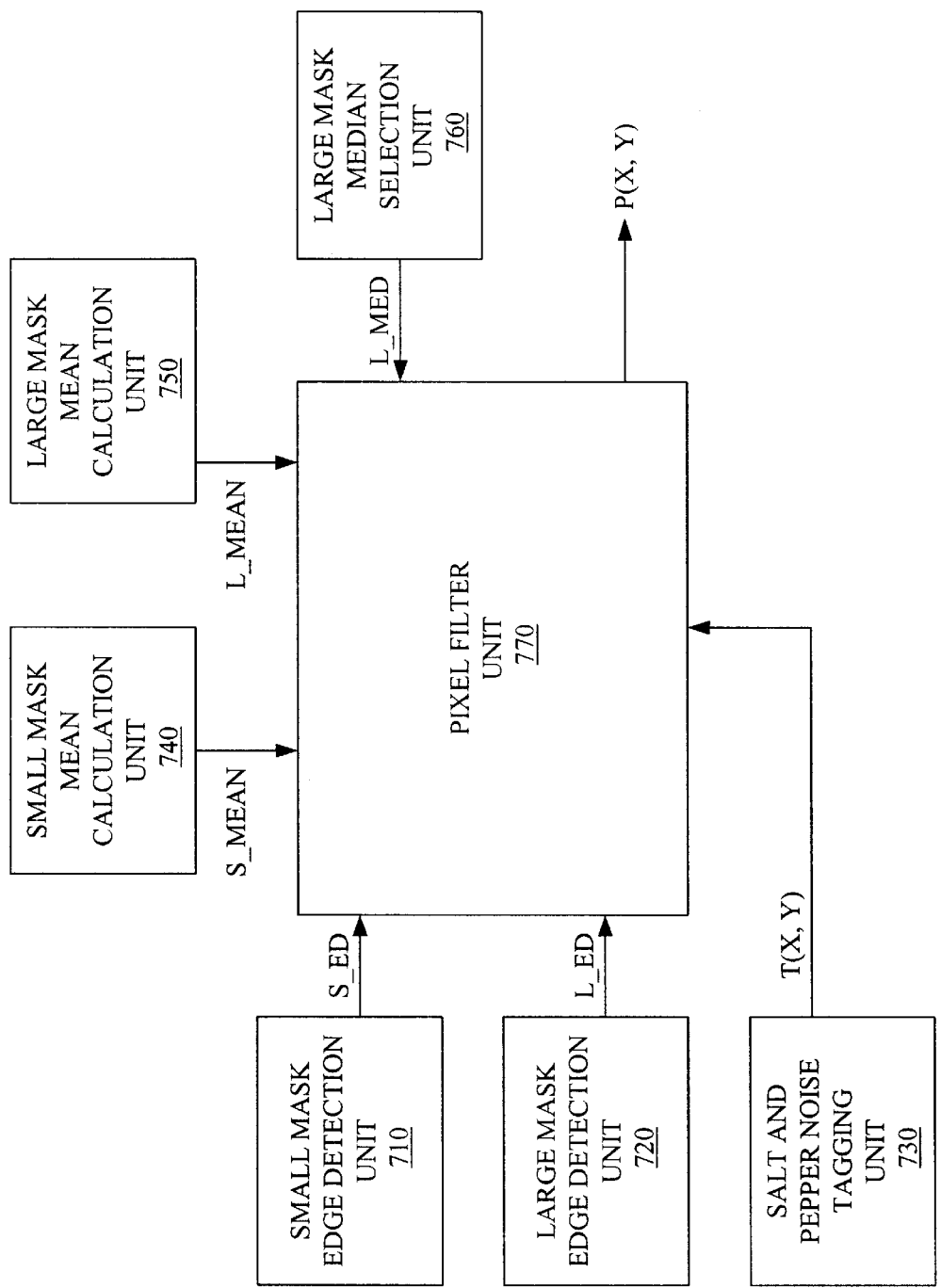
FIG. 7 is a block diagram of a noise filtering system in accordance with one embodiment of the present invention.

FIG. 7 is a block diagram of a noise filtering unit 700. The embodiment of FIG. 7 includes a small mask edge detection unit 710, a large mask edge detection unit 720, a salt and pepper noise tagging unit 730, a small mask mean calculation unit 740, a large mask mean calculation unit 750, a large mask median calculation unit 760, and a pixel filter unit 770. The embodiment of FIG. 7 reduces the time necessary to filter a pixel by performing edge detection on large mask 210 and small mask 610 simultaneously. Specifically, small mask edge detection unit 710 determines whether an edge exists within small mask 610 and drives an small edge detect signal S_ED to pixel filter unit 770. If an edge is detected in small mask 610, small mask edge detection unit 710 drives small edge detection signal S_ED to an active state (generally, logic high). Otherwise, small mask edge detection unit 710 drives small edge detection signal S_ED to an inactive state (generally, logic low). Similarly, large mask edge detection unit 720 determines whether an edge exists within large mask 210 and drives an large edge detect signal L_ED to pixel filter unit 770. If an edge is detected in large mask 210, large mask edge detection unit 720 drives large edge detection signal L_ED to an active state (generally, logic high). Otherwise, large mask edge detection unit 720 drives large edge detection signal L_ED to an inactive state (generally, logic low).

To further reduce processing time, the mean values for small mask 610 and large mask 210 as well as the median value of large mask 210 can also be calculated while performing edge detection. Specifically, small mask mean calculation unit 740 calculates the luminance mean of the pixels within small mask 610 and provides a small luminance mean S_MEAN value to pixel filter unit 770. Similarly, large mask mean calculation unit 750 calculates the luminance mean of the pixels within large mask 210 and provides a large luminance mean value L_MEAN to pixel filter unit 770. Large mask median selection unit 760 selects the median luminance of the pixels within large mask 210 and provides a large luminance median value L_MED to pixel filter unit 770.

Salt and pepper tagging unit 730 detects and tags salt and pepper noise within large mask 610. A tag T(X, Y) corresponding to pixel P(X, Y) is provided to pixel filter unit 770. If salt and pepper noise tagging unit 730 determines that pixel P(X, Y) is salt and pepper noise, salt and pepper noise tagging unit 730 drives tag T(X, Y) to the active state (generally, logic high) otherwise tag T(X, Y) is driven to the inactive state (generally, logic low). Salt and pepper noise tagging unit 730 can be the same as salt and pepper noise tagging unit 420. Alternatively, other salt and pepper noise tagging units may also be used.

Pixel filter unit 770, uses the values provided by the other components of noise filtering unit 700 to derive a value for pixel P(X, Y). Table 1 provides a truth table for pixel filtering unit 770 in accordance with one embodiment of the present invention. In table 1, the active state is logic high and represented by "1". Conversely, the inactive state is logic low and represented by "0".

TABLE 1

| S_ED | L_ED | T(X, Y) | P(X, Y) |
|------|------|---------|---------|
| 0 | 0 | 0 | L_MEAN |
| 0 | 0 | 1 | L_MEAN |
| 0 | 1 | 0 | S_MEAN |
| 0 | 1 | 1 | S_MEAN |
| 1 | 0 | 0 | Unchanged |
| 1 | 0 | 1 | L_MEDIAN |
| 1 | 1 | 0 | Unchanged |
| 1 | 1 | 1 | L_MEDIAN |

In the various embodiments of the present invention, novel structures have been described for noise filtering systems. By using both a large mask and a small mask more precise noise filtering is achieved. Furthermore, a fast salt and pepper noise filtering system can be used to further improve the noise filtering. The various embodiments of the structures and methods of this invention that are described above are illustrative only of the principles of this invention and are not intended to limit the scope of the invention to the particular embodiments described. For example, in view of this disclosure those skilled in the art can define other salt and pepper noise tagging units, edge detectors, threshold values, mask size, pixel tagging units, pixel filter units, mean calculation units, median selection units, and so forth, and use these alternative features to create a method, circuit, or system according to the principles of this invention. Thus, the invention is limited only by the following claims.

What is claimed is:

1. A method of noise detection for a first filter mask having a plurality of pixels, the method comprising:

separating the pixels of the first filter mask into a plurality of groups based on luminance;

determining a largest group in the plurality of groups;

tagging a first group of pixels as noisy when the first group is small and far from the largest group.

2. The method of claim 1, further comprising:

determining a group number for the largest group; and calculating a largest group size for the largest group.

3. The method of claim 2, wherein the tagging a first group of pixels as noisy when the first group is small and far from the largest group, comprises:

calculating a first group distance for the first group; and calculating a first group size for the first group.

4. The method of claim 3, wherein the tagging a first group of pixels as noisy when the first group is small and far from the largest group, further comprises calculating a first size ratio between the first group size and the largest group size.

5. The method of claim 4, wherein the tagging a first group of pixels as noisy when the first group is small and far from the largest group, further comprises tagging the first group as noisy when the first size ratio is less than a group size threshold and the first group distance is greater than a group distance threshold.

6. The method of claim 4, wherein the tagging a first group of pixels as noisy when the first group is small and far from the largest group, further comprises tagging the first group as noisy when the first size ratio is less than or equal to a group size threshold and the first group distance is greater than or equal to a group distance threshold.

7. The method of claim 1, further comprising tagging a second group of pixels as noisy when the second group is small and far from the largest group.

8. The method of claim 1, wherein the plurality of groups includes eight groups.

9. The method of claim 1, wherein the plurality of groups includes thirty-two groups.

10. The method of claim 1, wherein the first filter mask includes twenty-five pixels.

11. The method of claim 1, further comprising performing a second filtering process on the pixels of the first filter mask.

12. The method of claim 11, wherein the performing a second filtering process on the pixels of the first filter mask, further comprises:

performing edge-detection in a second filter mask having a subset of pixels including a center pixel from the pixels of the first filter mask; and replacing a value of the center pixel with a median value of the first filter mask when an edge is detected in the second filter mask and the center pixel is tagged as noisy.

13. The method of claim 12, wherein the performing a second filtering process on the pixels of the first filter mask, further comprises:

performing edge-detection in the first filter mask when an edge is not detected in the second filter mask;

replacing the value of the center pixel with a mean value of the second filter mask when an edge is detected in the first filter mask; and replacing the value of the center pixel with a mean value of the first filter mask when an edge is not detected in the first filter mask.

14. The method of claim 12, wherein the second filter mask includes nine pixels.

15. A system for filtering a center pixel of a large filter mask, wherein the large filter mask includes a plurality of pixels, the system comprising:

a pixel filter unit configured to calculate a new value for the center pixel;

a noise tagging unit coupled to the pixel filter unit, wherein the noise tagging unit is configured to tag the center pixel when the center pixel is a noisy pixel;

a large mask edge detection unit configured to determine whether the large filter mask contains an edge;

a small mask edge detection unit configured to determine whether a small filter mask contains an edge, wherein the small filter mask includes a subset of the pixels in the large filter mask;

a small mask mean calculation unit configured to calculate a mean value for the small filter mask;

a large mask mean calculation unit configured to calculate a mean value for the large filter mask; and a large mask median selection unit configured to select a median value for the large filter mask;

wherein the pixel filter unit is configured to generate the new value as the median value of the large filter mask when the small mask edge detection unit detects an edge in the second filter mask and the noise tagging unit tagged the center pixel as noisy.

16. The system of claim 15, wherein the pixel filter unit is configured to generate the new value as the mean value of the small filter mask when the large mask edge detection unit detects an edge in the large filter mask.

17. The system of claim 6, wherein the pixel filter unit is configured to generate the new value as the mean value of the large filter mask when the large mask edge detection unit does not detect an edge in the first filter mask.

* * * * *